United States Patent [19]

Frejborg

[11] 4,264,438

[45] Apr. 28, 1981

[54] SCREEN DRUM AND A METHOD FOR ITS MANUFACTURE

[75] Inventor: Frey Frejborg, Norrköping, Sweden

[73] Assignee: A. Ahlstrom Osakeyhtio, Noormarkku, Finland

[21] Appl. No.: 121,326

[22] Filed: Feb. 14, 1980

[30] Foreign Application Priority Data

Mar. 2, 1979 [FI] Finland ............................ 790663

[51] Int. Cl.[3] ......................... B07B 1/18; B01D 33/06

[52] U.S. Cl. ................................... 209/300; 209/270; 209/288; 209/301; 209/302; 209/303; 209/305; 209/407; 210/497.01; 29/163.5 F

[58] Field of Search ................ 209/270, 273, 397-399, 209/406, 407, 287, 288, 300, 301-306; 210/497 R, 497 FB, 497 C, 497.1; 29/163.5 F, 163.5 CW

[56] References Cited

U.S. PATENT DOCUMENTS

| | | | |
|---|---|---|---|
| 826,193 | 7/1906 | Reinicke | 209/399 |
| 959,979 | 5/1910 | Webb et al. | 209/399 |
| 2,204,835 | 6/1940 | Traylor | 209/399 |
| 2,347,716 | 5/1944 | Staege | 209/273 |
| 3,631,981 | 1/1972 | Young | 209/399 |
| 4,017,387 | 4/1977 | Hatton et al. | 209/399 X |

*Primary Examiner*—William A. Cuchlinski, Jr.
*Attorney, Agent, or Firm*—Bucknam and Archer

[57] ABSTRACT

A screen drum and a method for its manufacture is disclosed wherein the screen drum comprises at least two cylindrical screen members spaced apart, between which a stiffening ring is disposed. The stiffening ring has two cylindrical surfaces which guide the ends of the cylindrical screen members, and a projecting part between them. The cylindrical screen members and the stiffening ring are attached to each other by a weld joint connecting the projecting part of the stiffening ring and the ends of the cylindrical screen members and filling the gap between them.

8 Claims, 6 Drawing Figures

SCREEN DRUM AND A METHOD FOR ITS MANUFACTURE

The present invention relates to a screen drum provided with a stiffening ring or rings and to a method for its manufacture.

This kind of screen drums are generally used in screening apparatuses where the screen drum is subjected to heavy loads such as e.g. in pressure screens in pulp and paper mills. Up till now stiffening rings or ribs have been attached to the drums by spot welds, rivets, conic bolts or by angle weld joints as shown in FIG. 1 or by plug welds as shown in FIG. 2.

The notch effect brought about by an angle weld joint reduces the fatigue strength of a screen plate. The strength of a plug weld under tensile stress is comparatively low. The utilization of the plate material in the constructions used so far has not been economical enough to make them entirely satisfactory. Since the screen drums used in pulp and paper mills are usually made of expensive and corrosion-resistent steel, the need to use thicker plate material because of the strength-reducing joints causes considerable costs.

An object of the present invention is to provide an improved screen drum of high durability and fatigue strength but also one offering many other advantages as described more in detail in the following.

Characteristic of the screen drum according to the invention is that it comprises at least two cylindrical screen members axially some distance apart and a stiffening ring between them, having two cylindrical surfaces of approximately the same diameter as the inner or outer surface of the cylindrical screen members which guide the ends of the cylindrical screen members, and a flange-like projecting part between the cylindrical surfaces, the projecting part being disposed between opposed end surfaces of the cylindrical screen members, and that the cylindrical screen members and the stiffening ring are attached to each other by a weld joint or joints connecting the projecting part of the stiffening ring and the ends of the cylindrical screen member.

This invention relates also to a method for manufacturing a screen drum, characteristic of this manufacture being that it comprises disposing a stiffening ring having a projecting part between two adjacent cylindrical screen members so that the projecting part is between the end surfaces of the cylinders, as well as welding together the ends of the cylinders and the projecting part of the stiffening ring.

This invention has, among other things, following advantages:

the holes in the screen plates can be located near the stiffening ring; thus a large open area can be obtained the screen drum has a high strength under both internal and external loads the structure is flexible and fatigue proof the utilization of the raw material is optimal since cutting several blanks for cylindrical screen members out of a plate produces less waste than making the drum out of one blank the length of the screen drum is not subject to restrictions the costs caused by defects occurring in the manufacture of screen plates are reduced to a minimum since the plates possibly to be rejected are small.

the manufacture of a screen drum is easy to automatize.

According to an advantageous manufacturing method of the screen drum, the ends of the cylindrical screen members are expanded or contracted by an amount corresponding to the deformation caused by the welding stresses before the cylindrical screen members and the stiffening ring are welded together. In this way form defects in the screen drums can be eliminated. This is important e.g. in screens provided with vanes which clean the screen plate by sweeping close to its surface.

The invention is described more in detail in the following with reference to the accompanying drawings, in which FIG. 1 and 2 illustrate two applications of the prior art;

Figure 1:
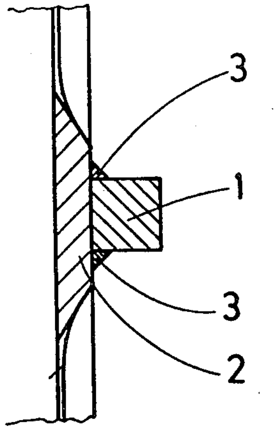
Figure 2:
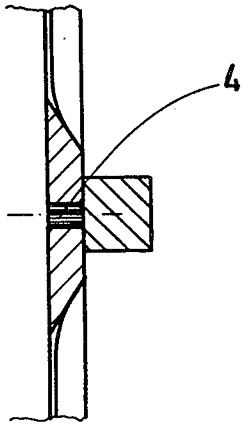

In the application of the prior art, shown in FIG. 1, a stiffening ring 1 has been attached to a cylindrical screen member 2 by two angle weld joints. In FIG. 2, the stiffening ring 1 has been attached to the cylindrical screen member by a plurality of plug welds 4 spaced apart.

Figure 3:
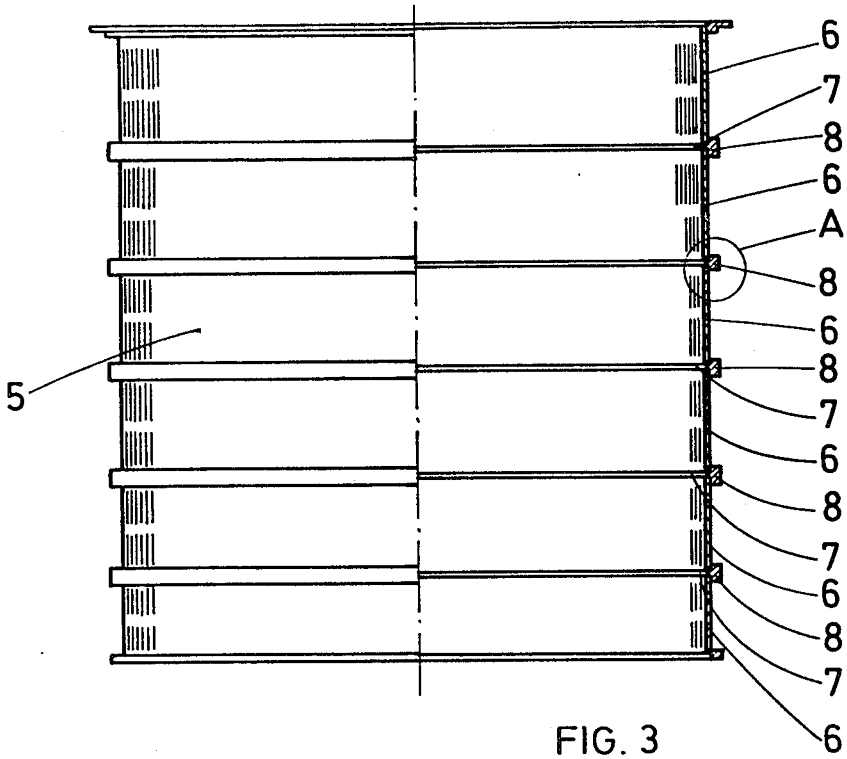
FIG. 3 is a side view, partly in section, of a screen drum according to the invention.
Figure 4:
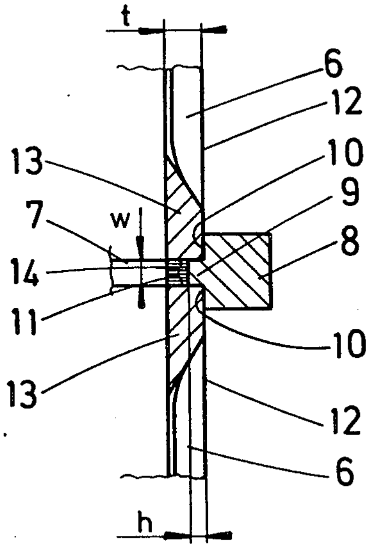
FIG. 4 shows point A of FIG. 3 on an enlarged scale.

FIG. 3 shows a screen drum 5 according to the invention that comprises a plurality of adjacent cylindrical screen members 6 between which there is a gap 7. In the screen drum, there are a plurality of stiffening rings 8 spaced apart which, as shown in FIG. 4, have been fitted so that a flange-like projecting part 9 between two cylindrical surfaces 10 of the stiffening ring is located between end surfaces 11 of the cylindrical screen members. The cylindrical surfaces of the stiffening ring are of the same size or slightly larger in diameter than the outer surface 12 of the cylindrical screen member so that, when assembling a screen drum, they can function as guiding surfaces for the ends 13 of the cylindrical screen member. The height (h) of the projecting part is less than the thickness (t) of the plate of the cylindrical screen member, preferably being 40–80% of the thickness of the plate. The width (w) of the projecting part is less than the thickness of the plate, preferably 40–80% of the plate thickness. The cylindrical screen members and the stiffening ring are attached by a weld joint 14, connecting the projecting part of the stiffening ring and the ends of the cylindrical screen member and filling the gap between the cylindrical screen members.

Figure 5:
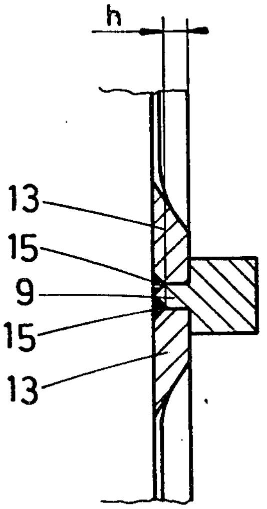
FIG. 5 shows an alternative embodiment of FIG. 3.

In the alternative embodiment illustrated in FIG. 5, the end surfaces of the cylindrical screen members are partly bevelled and the projecting part end of the stiffening ring is also bevelled so that two V-gaps 15 that are to be filled by welds form between the ends of the cylindrical screen members.

Figure 6:
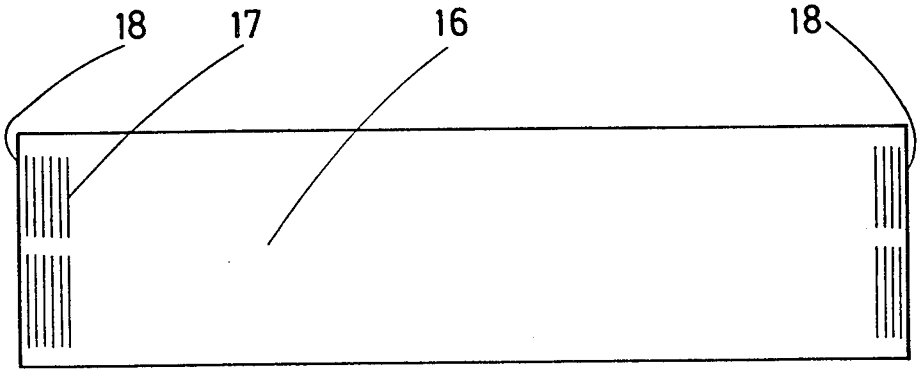
FIG. 6 illustrates a plate for a cylindrical screen member of a screen drum before having been shaped into a cylinder.

FIG. 6 illustrates a rectangular plate 16 with a plurality of adjacent slots 17 in two rows, out of which a cylindrical screen member is made by mangling in into cylinder shape and welding the opposite ends 18 together by axial welds.

Because of the welding stresses that occur in the weld connecting the cylindrical screen members and the exterior stiffening ring and that contract the screen drum, the ends of the cylindrical screen member should preferably be expanded before welding by the same amount as they are contracted by the welding stresses;

thus a screen drum of substantially cylindrical shape can be achieved. Empirically, the required radial expansion has been established to be 1–2%.

EXAMPLE

A screen drum according to FIG. 3 was assembled of cylindrical screen members 6 mm thick and 128 mm wide, the outer diameter of which was 1006 mm. The gap between the cylindrical screen members was 3 mm, the width of the stiffening rings 27 mm and height 18 mm, the diameter of the guiding surfaces being 1008 mm and the height of the projecting part 3 mm. Before welding, the ends of the cylindrical screen members were expanded by 2 mm/diameter. The gaps between the cylindrical screen members were filled by weld beads. The cylinder was straight after welding.

Despite the fact that the stiffening rings in the illustrated embodiments have been on the outer surface of the screen drum the invention can be applied also to screen drums provided with inner stiffening rings.

What is claimed is:

1. A screen drum which comprises at least two cylindrical screen members positioned in axially spaced apart relation to each other; a stiffening ring interposed between said screen members, said stiffening ring having two cylindrical surfaces each of approximately the same diameter as a corresponding cylindrical surface, said stiffening ring having a transversely projecting flange part extending between opposed end surfaces of said screen members, the cylindrical surfaces of the stiffening ring being in guiding engagement with the respective corresponding cylindrical surfaces of the screen members; and a weld joint connecting together the projecting flange part of the stiffening ring and said screen members.

2. A screen drum according to claim 1 wherein the height of said projecting flange part as measured transversely is less than the thickness of one of said screen members.

3. A screen drum according to claim 1 wherein the width of said projecting flange part as measured axially is less than the thickness of one of said screen members.

4. A screen drum according to claim 2 wherein the height of said projecting flange part is between 40 percent to 80 percent of the thickness of said one screen member.

5. A screen drum according to claim 3 wherein the width of said projecting flange part is between 40 percent to 80 percent of the thickness of said one screen member.

6. A method for manufacturing a screen drum having two cylindrical screen members and a stiffening ring which stiffening ring has two cylindrical surfaces and a transversely projecting flange part, which method comprises the steps of positioning the stiffening ring between respectively opposed ends of said screen members so that the projecting flange part extends between the opposed end surfaces of said screen members and the cylindrical surfaces of the stiffening ring are in guiding engagement with respective cylindrical surfaces of the screen members; and applying a weld joint connecting together the projecting flange part of the stiffening ring and the opposed end portions of said screen members.

7. A method according to claim 6 wherein before welding together the stiffening ring and the cylindrical screen members, the ends of the cylindrical screen members are radially deformed by an amount corresponding to the deformation caused by the welding stresses to thereby compensate for such stresses.

8. A method according to claim 7 wherein the radial deformation of the ends of the cylindrical screen members is between 1 percent to 2 percent.

* * * * *

UNITED STATES PATENT AND TRADEMARK OFFICE

CERTIFICATE OF CORRECTION

PATENT NO. : 4,264,438

DATED : APRIL 28,1981

INVENTOR(S) : FREY FREJBORG

It is certified that error appears in the above-identified patent and that said Letters Patent are hereby corrected as shown below:

On the abstract page, left column , item [30]

should be correct to read:

[30] Foreign application priority date

February 28,1979 [FI] Finland ------- 790633

Signed and Sealed this

*Fourteenth* Day of *July 1981*

[SEAL]

*Attest:*

GERALD J. MOSSINGHOFF

*Attesting Officer* *Commissioner of Patents and Trademarks*